(12) United States Patent
Miller et al.

(10) Patent No.: US 11,565,494 B2
(45) Date of Patent: Jan. 31, 2023

(54) SUSTAINABLE INDUSTRIAL HOSE

(71) Applicant: ContiTech USA, Inc., Fairlawn, OH (US)

(72) Inventors: Lance Miller, Uniontown, OH (US); Jeffrey T. Epperson, Mount Pleasant, IA (US); Jenny Zhaoxia Yu, Shanghai (CN); Mathew Augustine, Fairlawn, OH (US); Jeffrey P. Dotson, Riverside, IA (US)

(73) Assignee: ContiTech USA, Inc., Fairlawn, OH (US)

(*) Notice: Subject to any disclaimer, the term of this patent is extended or adjusted under 35 U.S.C. 154(b) by 0 days.

(21) Appl. No.: 17/453,201

(22) Filed: Nov. 2, 2021

(65) Prior Publication Data
US 2022/0055336 A1 Feb. 24, 2022

Related U.S. Application Data

(63) Continuation-in-part of application No. 16/813,173, filed on Mar. 9, 2020, now Pat. No. 11,168,815.

(51) Int. Cl.
F16L 11/08 (2006.01)
B32B 1/08 (2006.01)
(Continued)

(52) U.S. Cl.
CPC ............... *B32B 1/08* (2013.01); *B32B 5/026* (2013.01); *B32B 7/12* (2013.01); *B32B 25/10* (2013.01);
(Continued)

(58) Field of Classification Search
CPC ............. F16L 11/00; F16L 11/12; F16L 11/04
(Continued)

(56) References Cited

U.S. PATENT DOCUMENTS 4,341,675 A * 7/1982 Nakamura ............... C08K 5/14
524/506
4,833,194 A * 5/1989 Kuan ...................... C08L 23/16
524/427
(Continued)

FOREIGN PATENT DOCUMENTS

EP 0933576 A1 8/1999
EP 2589622 A1 5/2013
(Continued)

OTHER PUBLICATIONS

LANXESS Deutschland GmbH / Arlanxeo—Keltan Eco 8550 Product Data Sheet.
(Continued)

*Primary Examiner* — Patrick F Brinson
(74) *Attorney, Agent, or Firm* — David L. Cate; Gregory Adams

(57) ABSTRACT

Hoses include an inner tube, a reinforcement layer disposed outwardly from the inner tube, and a cover layer disposed outwardly from the reinforcement layer, where the cover layer and/or the inner tube includes a cured composition having a sustainable content and formed from a mixture including EPDM/EPR sustainable polymer and a sulfur or peroxide based curing system. In some cases, the EPDM/EPR sustainable polymer has ethylene monomer derived from one or more renewable sources, such as, ethylene monomer derived from sugar cane. The mixture may further include one or more of recovered carbon black and sustainable oils from renewable sources. The hose embodiments may also include the reinforcement layer formed of fibers from sustainable material. The hose may contain the sustainable content in an amount of up to 75% by weight based upon total hose weight, or even greater than 25% by weight based upon total hose weight.

20 Claims, 3 Drawing Sheets

(51) Int. Cl.
  *B32B 25/16* (2006.01)
  *B32B 25/10* (2006.01)
  *B32B 5/02* (2006.01)
  *B32B 7/12* (2006.01)

(52) U.S. Cl.
  CPC .............. *B32B 25/16* (2013.01); *F16L 11/08* (2013.01); *B32B 2255/02* (2013.01); *B32B 2255/26* (2013.01); *B32B 2270/00* (2013.01); *B32B 2597/00* (2013.01); *F16L 11/081* (2013.01); *F16L 11/085* (2013.01)

(58) Field of Classification Search
  USPC ........ 138/123–126, 137, 141, 140; 428/36.9, 428/36.91
  See application file for complete search history.

(56) References Cited

U.S. PATENT DOCUMENTS

| | | | |
|---|---|---|---|
| 5,279,874 | A | 1/1994 | Ichikawa et al. |
| 5,504,156 | A * | 4/1996 | Takezaki ............. C08L 23/0876 525/196 |
| 8,487,014 | B1 | 7/2013 | Flanigan |
| 8,752,591 | B2 | 6/2014 | Montalvo et al. |
| 9,976,021 | B2 | 5/2018 | Li et al. |
| 2002/0100516 | A1 | 8/2002 | Powell et al. |
| 2002/0113333 | A1 | 8/2002 | Liu et al. |
| 2003/0178081 | A1 | 9/2003 | Ikemoto et al. |
| 2005/0238832 | A1 | 10/2005 | Kostamo |
| 2011/0023988 | A1 | 2/2011 | Ludwig et al. |
| 2012/0186684 | A1 | 7/2012 | Giovannetti et al. |
| 2013/0068335 | A1 | 3/2013 | Oyaizu et al. |
| 2013/0340876 | A1 | 12/2013 | Boday et al. |
| 2014/0027003 | A1 | 1/2014 | Van Eibergen et al. |
| 2016/0355665 | A1 | 12/2016 | Daute et al. |
| 2019/0315948 | A1 | 10/2019 | Delevati et al. |
| 2020/0080667 | A1 | 3/2020 | Miller |

FOREIGN PATENT DOCUMENTS

| | | |
|---|---|---|
| KR | 20160123473 A | 10/2016 |
| WO | 2021038345 A1 | 3/2021 |

OTHER PUBLICATIONS

Duin M. Van / Keltan defining EPDM for the past and the next 50 years part 1.
Arlanxo, Keltan Eco 8550, Product data sheet, Oct. 30, 2013, p. 1, Germany.
Philip Hough & Marjan Van Urk, Keltan Eco, Presentation, Apr. 2013, pp. 3, 5-7, Germany.
Martin Van Duin & Philip Hough, Green EPDM Compounds, Journal, Feb. 2018, p. 26, Germany.
Dr. Joerg Strassburger, Lanxess Keltan elastomers ideal for weather strips and coolant hoses, Article from Motorindia magazine, Apr. 21, 2014, pp. 1-2, India.

* cited by examiner

SUSTAINABLE INDUSTRIAL HOSE

CROSS REFERENCE TO RELATED APPLICATIONS

This Patent Application is a Continuation-In-Part Application of, and claims priority to, U.S. Nonprovisional patent application Ser. No. 16/813,173 filed Mar. 9, 2020, which is incorporated herein in its entirety, by reference.

FIELD

The field to which the disclosure generally relates to hoses and particularly to high performance, reinforced hoses which are useful in a wide variety of applications. More specifically, the present invention relates to reinforced hoses where one or more layers of the hoses are formed from sustainable rubber materials and/or reinforcements.

BACKGROUND

This section provides background information to facilitate a better understanding of the various aspects of the disclosure. It should be understood that the statements in this section of this document are to be read in this light, and not as admissions of prior art.

Rubber hoses are used in a variety of applications for transporting fluids such as liquids and gases. For example, such hoses are commonly used as garden hoses, refrigeration hoses, torque converter hoses, automotive heater hoses, coolant hoses, power transmission hoses, power steering hoses, etc. It is necessary that such hoses not only be flexible enough to meet dimensional configurations required for such applications, but that the hose be sufficiently resistant to internal forces which may tend to deform the hose due to high pressure of the liquid or gas flowing through the hose. In order to ensure that the hose meets these requirements, manufacturers of hoses for use in high, medium or low-pressure environments typically include a reinforcement layer between an inner tubular layer and an outer tubular layer, both formed from a petroleum-based material. Natural rubber is also commonly used as well.

A commonly used petroleum-based material for forming one or more rubber layers is ethylene-propylene diene terpolymer (EPDM). The EPDM polymer is made from ethylene, propylene, and a diene comonomer that enables crosslinking via sulfur vulcanization. The ethylene and propylene raw material components are typically derived from petroleum. Another commonly used petroleum-based material for forming one or more rubber layers is ethylene propylene rubber (EPR) which also has ethylene and propylene raw material components derived from petroleum.

There is an ongoing goal to use renewable materials for forming rubber and/or reinforcement materials, for example, EPDM and/or EPR sustainable polymers made of ethylene which is derived from sustainable sources and not from petroleum. Such need is met, at least in part, with embodiments according to this disclosure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In a first aspect of the disclosure, hoses include an inner tube, a reinforcement layer disposed outwardly from the inner tube, and a cover layer disposed outwardly from the reinforcement layer, where the cover layer includes a cured composition having a sustainable content and formed from a mixture including EPDM/EPR sustainable polymer and a sulfur or peroxide based curing system. In some cases, the EPDM/EPR sustainable polymer has ethylene monomer derived from one or more renewable sources, such as, but limited to, ethylene monomer derived from sugar cane. The mixture may further include one or more of recovered carbon black and sustainable oils from renewable sources. The hose embodiments may also include the reinforcement layer of fibers from sustainable material. In some embodiments, the hose contains the sustainable content in an amount of up to 75% by weight based upon total hose weight, or greater than 25% by weight based upon total hose weight, or even greater than 50% by weight based upon total hose weight.

In another aspect of the disclosure, hoses include an inner tube, a reinforcement layer disposed outwardly from the inner tube, and a cover layer disposed outwardly from the reinforcement layer, where the inner tube includes a cured composition having a sustainable content and formed from a mixture including EPDM/EPR sustainable polymer and a sulfur or peroxide based curing system. In some cases, the EPDM/EPR sustainable polymer has ethylene monomer derived from one or more renewable sources, such as, but limited to, ethylene monomer derived from sugar cane. The mixture may further include one or more of recovered carbon black and sustainable oils from renewable sources. The hose embodiments may also include the reinforcement layer of fibers from sustainable material. In some embodiments, the hose contains the sustainable content in an amount of up to 75% by weight based upon total hose weight, or greater than 25% by weight based upon total hose weight, or even greater than 50% by weight based upon total hose weight. In some cases, the cover layer also includes a cured composition formed from a mixture including EPDM/EPR sustainable polymer and a sulfur or peroxide based curing system.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount or value range listed or described as being useful, suitable, or the like, is intended that any and every concentration or amount or value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Figure 1:
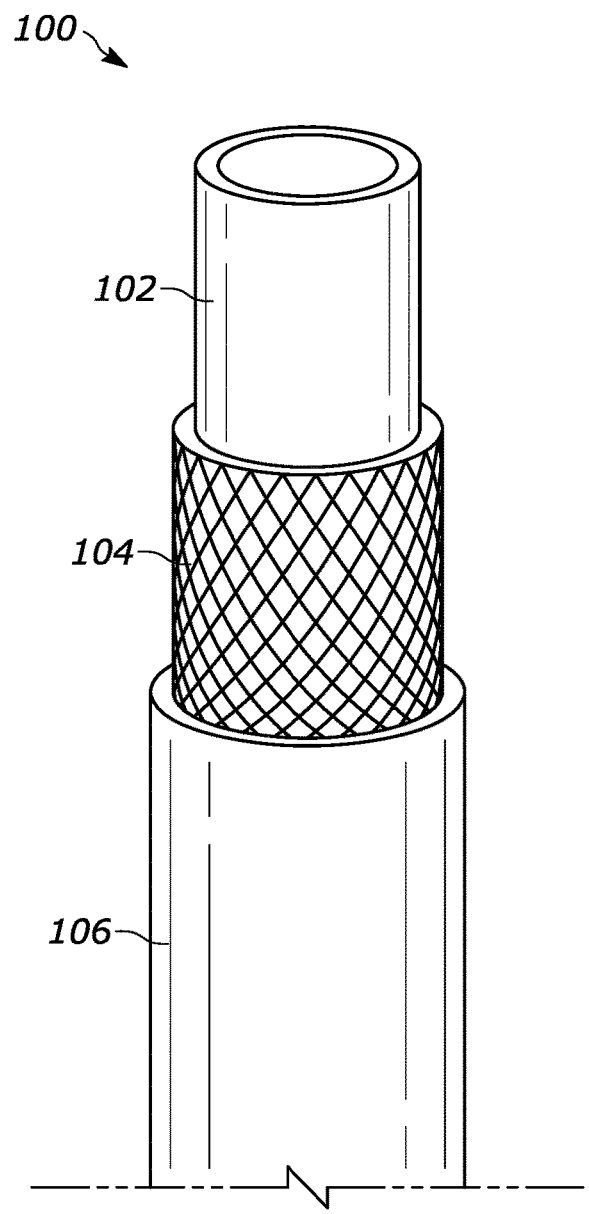
FIG. 1 illustrates in perspective view, a hose according to some aspects of the disclosure; and, FIG. 2 depicts in perspective view, another hose according to some aspects of the disclosure.

Some hose embodiments according to the disclosure have the structure shown in FIG. 1. The hose 100 is composed of at least an inner tube 102, reinforcing layer 104, and outer cover layer 106. In some aspects, the outer cover layer 106 is formed from EPDM and/or EPR sustainable polymers (hereinafter referred to as "EPDM/EPR sustainable polymers" or "EPDM/EPR sustainable polymer") using ethylene monomer derived from one or more renewable sources. However, it is within the scope of the disclosure that either or both the inner tube 102 and the outer cover layer 106 are formed by cured composition having a sustainable content which includes EPDM/EPR sustainable polymers, as well as other optional sustainable ingredients from renewable or recoverable sources, as part of the sustainable content. So long as it is in the range where the properties of the hoses of the disclosure are not impaired, a composition other than the EPDM/EPR sustainable polymers may also, in some aspects, be used for the inner tube 102 or outer cover layer 106. In addition to hoses, the EPDM/EPR sustainable polymers may be useful for other rubber based articles.

Some non-limiting examples of renewable sources are one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof. Some useful EPDM/EPR sustainable polymers are those disclosed in United States Pat. App. Pub. 20190315948 A1, the disclosure of which is incorporated herein by reference thereto.

Crosslinking of the EPDM/EPR sustainable polymers mostly takes place via vulcanization with sulfur, but may also accomplished with peroxides (for better heat resistance) or with phenolic resins.

The EPDM/EPR sustainable polymers useful in forming the inner tube 102 and/or cover layer 106 may be admixed with from about 50 to about 700 phr, of fillers such as carbon black, calcium carbonate, talc, clay or silica, or mixtures of the foregoing. Other conventional additives, process and extender oils, antioxidants, waxes, pigments, plasticizers, softeners and the like may be added according to common rubber processing practice without departing from the disclosure. For example, in some embodiments, the elastomeric composition also contains from about 0.5 to about 1.5 phr of an antiozonant or antioxidant and from about 10 phr to about 200 phr of a paraffinic oil and/or naphthenic oil plasticizer/softener. Also, in some embodiments, the amount of carbon black is from about 200 phr to about 400 phr, and the amount of calcium carbonate is from about 150 phr to about 350 phr.

In some aspects, recovered carbon black (rCB) and/or sustainable oils from renewable sources (as part of the sustainable content) are admixed with the EPDM/EPR sustainable polymer, and it is within the scope of the disclosure that either or both the inner tube 102 and the outer cover layer 106 is/are formed from EPDM/EPR sustainable polymers admixed with recovered carbon black and/or sustainable oils from renewable sources. The recovered carbon black may be derived from any suitable source(s), such as, but not limited to, scrap tire, roofing membrane process start up scrap, conveyor belt scrap, and/or hose scrap. Sustainable oils may be derived from any suitable source(s), such as, but not limited to, automotive motor oil recycling, bio-derived oils such as corn oil, coconut oil, rapeseed oil, soybean oil, vegetable oil, etc., and the like.

In some other aspects, silica and calcium carbonate derived from renewable sources such as, but not limited to silica recycled from waste rice husks, and recycled calcium carbonate from waste eggshells, are also suitable as fillers in industrial hose, as well as other rubber based articles. These materials can be added as replacements of mined or synthetic versions of these materials, or used in addition to mined or synthetic versions of these materials, in the compounds.

Referring again to FIG. 1, the reinforcing layer 104 constituting the hose 100 is not particularly limited, but like the reinforcing layer of a conventional hose may be one or more layers of a yarn produced from a vinylon fiber, rayon fiber, hemp fiber, polyester fiber, polyvinyl acetate fiber, nylon fiber, aramid fiber, natural fiber, etc. or a metal wire or metal alloy wire etc. braided, wrapped in a spiral, or wrapped in a plurality of spiraled layers wound in counter directions. In some other aspects, the reinforcement layer may be formed from sustainable materials as part of the sustainable content, as well.

In hose embodiments according to the disclosure, the sustainable content weight amount, including the EPDM/EPR sustainable polymer, and other optional materials from sustainable or renewable sources or recovered materials, when used, may be up to about 95% by weight based upon total hose weight, up to about 75% by weight based upon total hose weight, up to about 65% by weight based upon total hose weight, greater than 50% by weight based upon total hose weight, greater than 40% by weight based upon total hose weight, greater than 25% by weight based upon total hose weight, or even greater than 5% by weight based upon total hose weight.

Further, in the production of some hoses according to the disclosure, it is possible to produce the inner tube 102 by known extrusion processes, provide an optional bonding layer or reinforcement on its outer surface if necessary, braid/spiral the reinforcing layer 104 over the same, and cover the same with the outer cover 106 by extrusion so as to bond the layers of the hose integrally. The hoses may then be cured.

Figure 2:
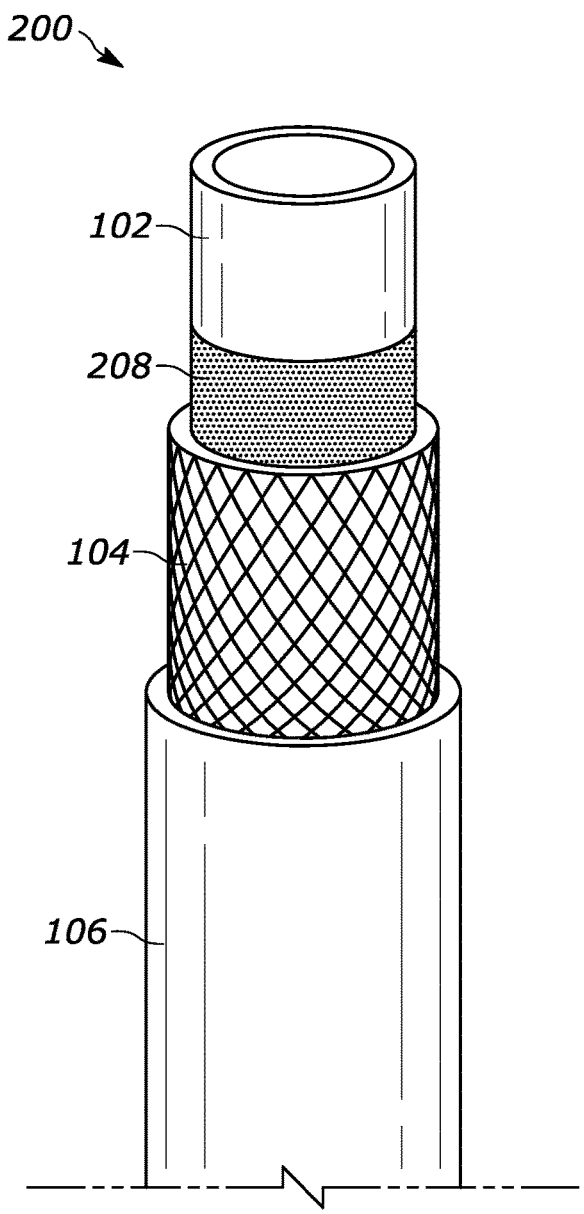

In another aspect of the disclosure, some hose embodiments have the structure shown in FIG. 2. The hose 200 includes an inner tube 102, reinforcing layer 104, outer cover 106, similar to hose 100 described above, and further includes layer 208, which may be a ply reinforcement layer, or a bonding layer, or backing layer, or barrier layer, and layer 208 is disposed between inner tube 102 and reinforcing layer 104. When used as a ply reinforcement layer, it is not particularly limited, but may be produced from a vinylon fiber, rayon fiber, polyester fiber, nylon fiber, fiber from sustainable material, or aramid fiber, etc. in a ply configuration. When used as a barrier layer, it is not particularly limited, but may be produced from nylon, PVDF, THV, and the like.

Figure 3:
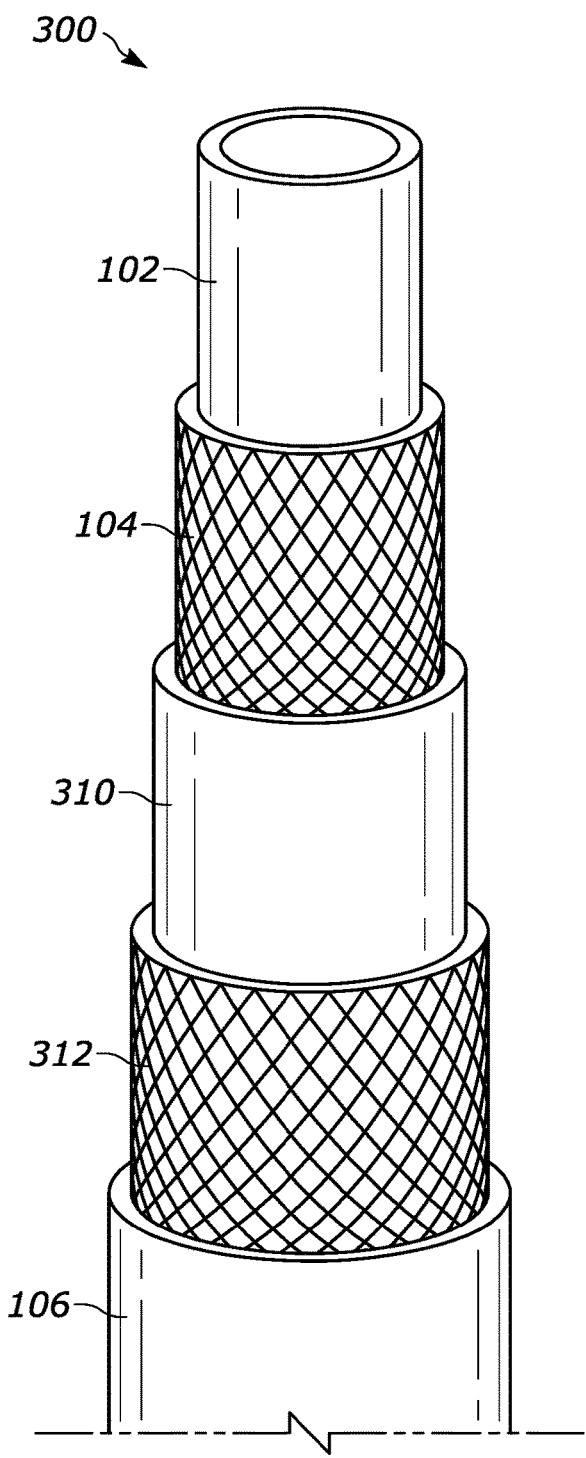
FIG. 3 illustrates in perspective view, yet another hose according to some aspects of the disclosure.

In yet another aspect of the disclosure, some hose embodiments have the structure shown in FIG. 3. The hose 300 includes an inner tube 102, reinforcing layer 104, friction layer 310, second reinforcing layer 312, and outer cover 106. The second reinforcing layer 312, is not particularly limited, but may be produced from a vinylon fiber, rayon fiber, polyester fiber, nylon fiber, aromatic polyamide fiber, fiber from sustainable material, etc. or a hard steel wire etc. braided, wrapped in a spiral, or wrapped in a plurality of spiraled layers wound in counter directions.

Figure 4:
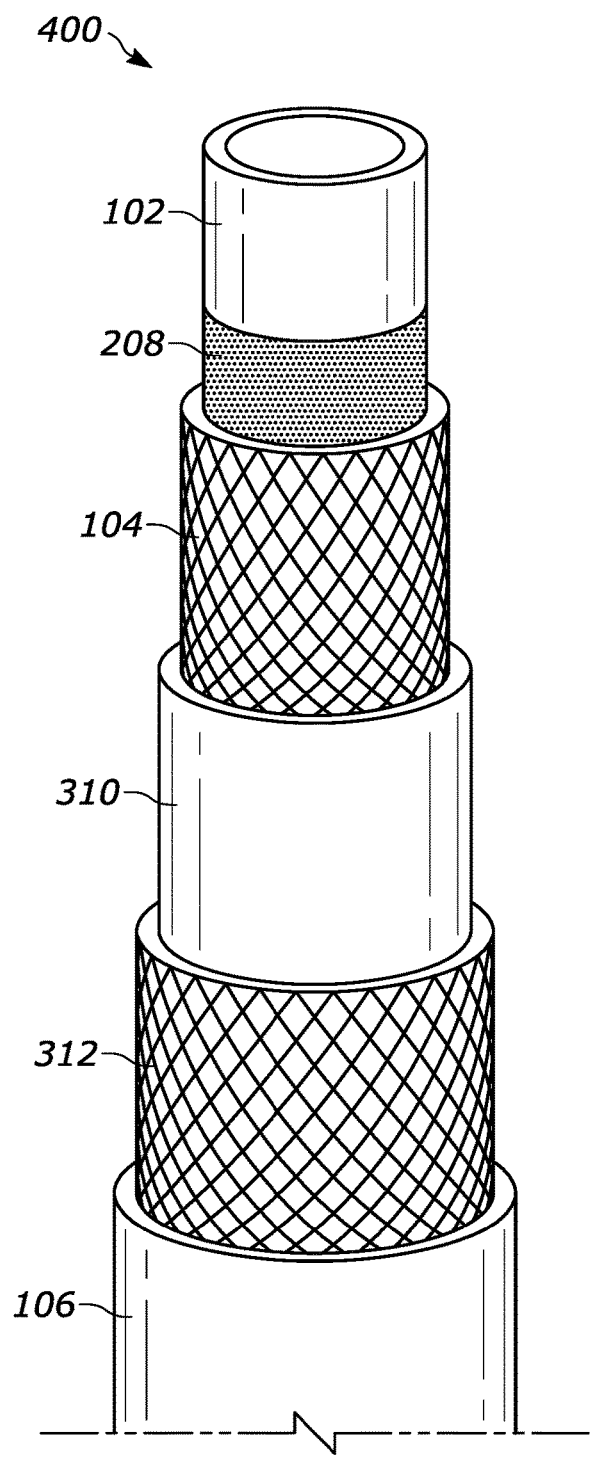
FIG. 4 depicts in perspective view, another hose according to some aspects of the disclosure.

In some another aspects of the disclosure, hose embodiments have the structure shown in FIG. 4. Hose 400 includes an inner tube 102, reinforcing layer 104, friction layer 310, second reinforcing layer 312, and outer cover 106. The hose further includes a layer 208 disposed between inner tube 102 and reinforcing layer 104.

With regards to the reinforcing layers 104, friction layers 310, second reinforcing layers 312, outer covers 106, and ply reinforcement layers depicted above, such may be formed from any suitable materials know to those of skill in the art. In some aspects, such layers may be formed from those materials disclosed in U.S. Pat. No. 6,179,008 B1, which is incorporated herein by reference thereto.

Figure 5:
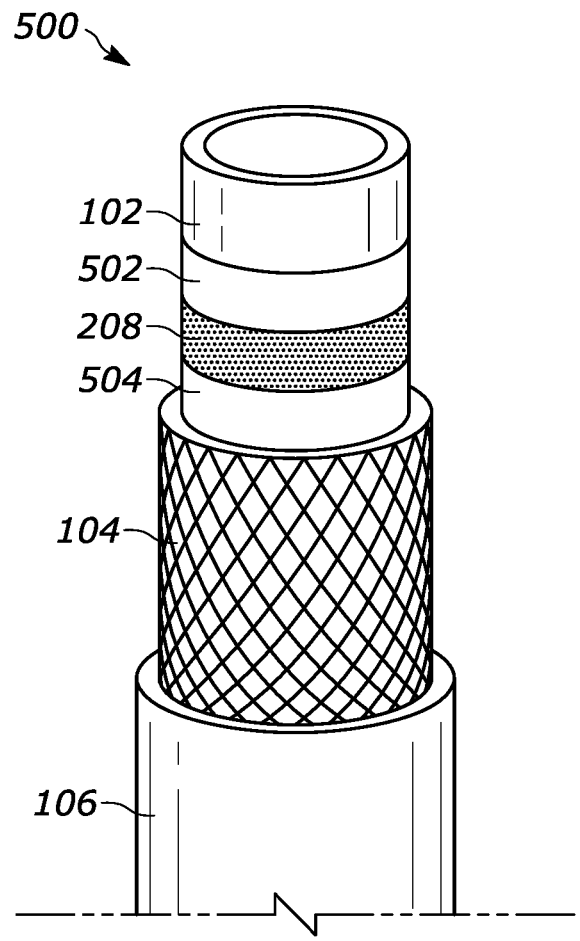
FIG. 5 illustrates in perspective view, yet another hose according to some aspects of the disclosure; and, FIG. 6 depicts in perspective view, another hose according to some aspects of the disclosure.
Figure 6:
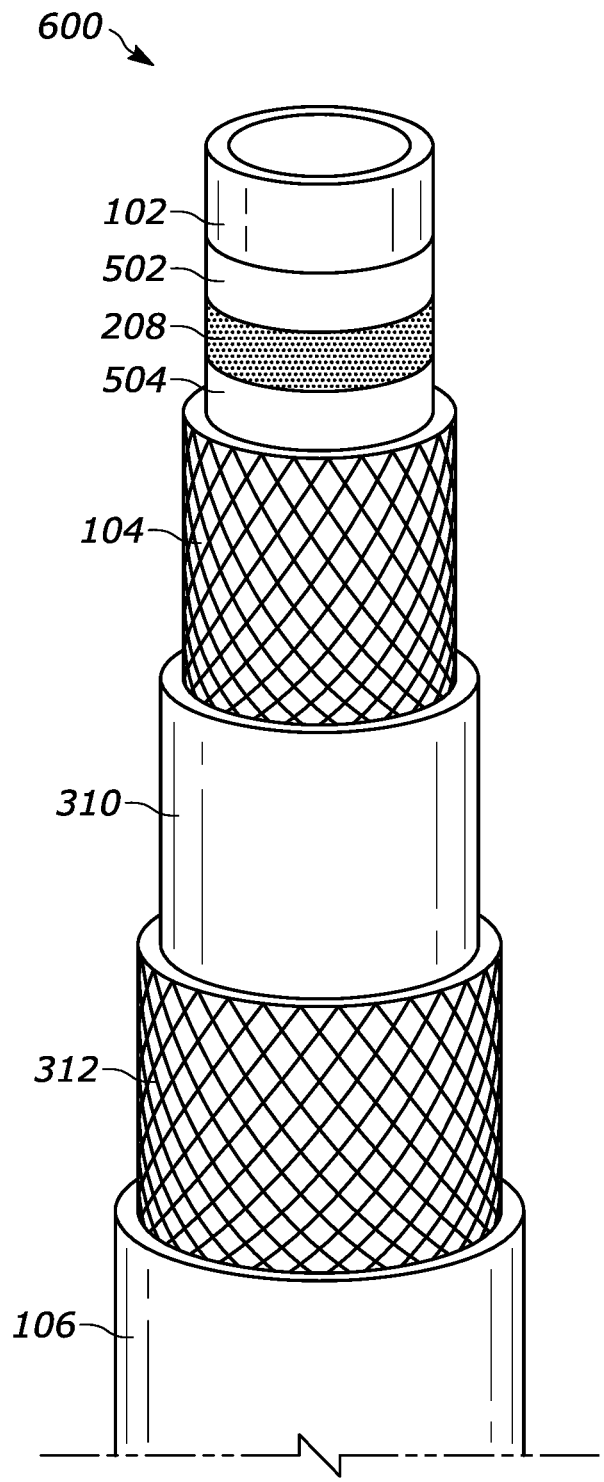

Now referencing FIG. 5 which depicts some other hose embodiments according to the disclosure. Hose 500 includes an inner tube 102, reinforcing layer 104, outer cover 106, layer 208, which may be a ply reinforcement layer, or a bonding layer, or backing layer, or barrier layer, similar to hose 200 described above. Disposed between inner tube 102 and layer 208 is a friction layer 502. Also, disposed between layer 208 and reinforcing layer 104 is friction layer 504. With reference to FIG. 6, hose 600 is similar to hose 500, and further includes friction layer 310 and second reinforcing layer 312 disposed between reinforcing layer 104 and outer cover 106, as shown. According to some aspects of the disclosure, layers 502, 504, or 310, or any combination thereof, may also include EPDM/EPR sustainable polymers.

As described above, each of the reinforcing layers may be formed by spiral winding one or more layers of a yarn or hard steel wire. Reinforcing layers may also be formed from braid or knit reinforcements. In those cases where two layers of a yarn, metal wire, or metal alloy wire are used, a first layer may be spiral wound in a first winding direction, and a second layer spiral wound in a second winding direction opposite the first winding direction. In some cases, the first layer is laid at a positive angle relative to the longitudinal axis of the hose, and the second layer laid at a negative angle relative to the longitudinal axis. The angle of one of layers may be between about 45° and 65°, and the angle of the other layers between about −45° and −65°.

The optional friction layer used in embodiments according to the disclosure is typically from about 0.020 inches (0.5 mm) to about 0.051 inches (1.3 mm) thick, is more typically from about 0.024 inches (0.6 mm) to about 0.043 inches (1.1 mm) thick, and in some aspects, will be from about 0.028 inches (0.7 mm) to about 0.035 inches (0.9 mm) in thickness. The friction layer may be formed from any suitable curable rubber based composition, containing such rubber as EPDM/EPR sustainable polymer, acrylonitrile butadiene rubber (NBR), hydrogenated NBR, carboxylated NBR, polychloroprene, fluoroelastomer, epichlorohydrin, nitrile, carboxylated nitrile rubber, CPE, CSM, styrene-butadiene rubber (SBR), NBR/PVC blends, or any blends thereof.

The curable rubber employed in the friction layer of some hoses in accordance with the disclosure, may also contain various additives in conventional or suitable amounts known to persons having ordinary skill in the art. Such additives may include, and are not limited to, retardants to prevent an unduly quick cure, antioxidants, adhesion promoters, processing aids, reinforcing agents, talc and fillers, such as carbon black, silica, other mineral fillers, lignin, and the like. Reinforcing fillers are typically utilized at a level which is within the range of about 20 parts per hundred parts (phr) to about 400 phr. In some embodiments, talc is incorporated in an amount of from about 10 phr to about 60 phr, and such may be included in compositions useful in any layers of the hoses.

Referring again to cover layers, in some embodiments according to the disclosure, cover layers have a thickness of from about 0.039 inches (1 mm) to about 0.12 inches (3 mm), from about 0.059 inches (1.5 mm) to about 0.098 inches (2.5 mm), and in some instances, about 0.067 inches (1.7 mm) to about 0.075 inches (1.9 mm). In some aspects, the cover layer can be formed from the EPDM/EPR sustainable polymer, acrylonitrile butadiene rubber (NBR), hydrogenated NBR, carboxylated NBR, polychloroprene, fluoroelastomer, epichlorohydrin, nitrile, carboxylated nitrile rubber, CPE, CSM, styrene-butadiene rubber (SBR), NBR/PVC blends, or any blends thereof. Any of the materials forming the cover layer may be further loaded with metal particles, carbon black, or another electrically-conductive particulate, flake, or fiber filler so as to render the hose electrically-conductive for static dissipation or other applications. The compositions forming the cover layer also include such additives as retardants to prevent an unduly quick cure, antioxidants, adhesion promoters, processing aids, reinforcing agents and fillers, such as carbon black, silica, other mineral fillers, lignin, and the like.

As described above, the inner tube may be formed from the EPDM/EPR sustainable polymer, acrylonitrile butadiene rubber (NBR), hydrogenated NBR, carboxylated NBR, polychloroprene, fluoroelastomer, epichlorohydrin, nitrile, carboxylated nitrile rubber, CPE, CSM, styrene-butadiene rubber (SBR), NBR/PVC blends, or any blends thereof. Any suitable amount of these materials may be used. Additional fillers and additives may be included in the formulation of the composition depending upon the requirements of the particular application envisioned. Such fillers and additives, which may be functional or inert, may include curing agents or systems, wetting agents or surfactants, plasticizers, processing oils, pigments, dispersants, dyes, and other colorants, opacifying agents, foaming or anti-foaming agents, anti-static agents, coupling agents such as titanates, chain extending oils, tackifiers, flow modifiers, pigments, lubricants, silanes, and other agents, stabilizers, emulsifiers, antioxidants, thickeners, free sulfur, peroxide(s), and/or flame retardants. The formulation of the material may be compounded in a conventional mixing apparatus as an admixture of the rubber and filler components, and any additional fillers or additives.

The thickness of the inner tube in some embodiments according to the disclosure, may be from about 0.031 inches (0.8 mm) to about 0.157 inches (4 mm), and in some instances, from about 0.039 inches (1.0 mm) to about 0.138 inches (3.5 mm).

One example was prepared for the purpose of further illustrating the nature of some of the embodiments and aspects of the disclosure and are not intended as a limitation on the scope thereof. A hose was prepared using EPDM sustainable polymer for the inner tube and the cover layer. The hose also included two reinforcement layers, and friction layers disposed between the inner tube and a first reinforcement layer, and also between the two reinforcement layers. The hose inside diameter was about 15.9 mm and the outside diameter was about 22.9 mm. The hose was tested for certain properties. The hose had a burst pressure of greater than 2.76 MPa, and in one test the burst pressure was 3.30 MPa. Tested independently, each of the inner tube and cover layer, after curing, had a tensile strength values of 5 MPa or greater; and in one test, the inner tube had tensile strength of 5.2 MPa, and the cover layer had tensile strength of 6.0 MPa.

The following are non-limiting examples of rubber compound formulations (shown in Table 1) which provide suitable rubber layer properties, while having high sustainable content where many of the raw materials are derived from renewable sources. In examples 2 through 4, utilizing sugar cane based EPDM, waste eggshell based calcium carbonate, waste rice husk based silica, recovered carbon black, and sustainable source oil, provide compounds containing over 90% by weight of sustainable materials. The numbers shown in the examples are in units of weight.

TABLE 1

| Ingredient | Ex. 2 | Ex. 3 | Ex. 4 |
| --- | --- | --- | --- |
| Zinc Oxide | 3 | 5 | 3 |
| Peloton Tech Small Size Eggshell Calcium Carbonate | 235 | 235 | 235 |
| Sulfur | 5 | 5 | 5 |
| Oryazsil ED 175 MP Silica from Rice Husks | 43 | 43 | 43 |

TABLE 1-continued

| Ingredient | Ex. 2 | Ex. 3 | Ex. 4 |
| --- | --- | --- | --- |
| Delta Energy E700 Recovered Carbon Black | 235 | 235 | 235 |
| MBTS (Benzothiazyl Disulfide) Accelerator | 3 | 3 | 3 |
| DTDM (4,4' Dithiodimorpholine) Accelerator | 0.8 | 0.8 | 1.2 |
| NDBC Antioxidant | 1.5 | 1.5 | 1.5 |
| Stearic Acid | 1 | 2 | 1 |
| Pionier 10227 Sustainable Oil | 160 | 160 | 160 |
| TMTD (Tetramethylthiuram Disulfide) | 0.8 | 0.8 | 0.8 |
| Sugar Cane EPDM | 100 | 100 | 100 |

In addition to the hose applications described above, the EPDM/EPR sustainable polymers and other sustainable materials may be useful for other applications, for such articles as roofing membranes, seals, roll covers, vibration control, electrical insulation, belts, gaskets, automotive heating and cooling lines, air conditioning hose, turbocharger, engine and drivetrain systems and likely anywhere else EPDM can be used. In hose applications, the hoses may be water or air hoses for industrial or automotive applications, such as garden hose, air hoses, steam hose, automotive washer tubing, food/beverage hose, and the like.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A hose comprising an inner tube, a reinforcement layer disposed outwardly from the inner tube, and a cover layer disposed outwardly from the reinforcement layer, wherein the cover layer comprises a cured composition having a sustainable content and formed from a mixture comprising EPDM/EPR sustainable polymer, silica, calcium carbonate, and a sulfur or peroxide based curing system, wherein the EPDM/EPR sustainable polymer comprises ethylene monomer derived from one or more renewable sources, and wherein silica and calcium carbonate are derived from other renewable sources.

2. The hose according to claim 1, wherein the silica is derived from waste rice husks, and wherein the calcium carbonate is derived from waste eggshells.

3. The hose according to claim 1, wherein the EPDM/EPR sustainable polymer comprises ethylene monomer derived from sugar cane.

4. The hose according to claim 1, wherein the mixture further comprises recovered carbon black.

5. The hose according to claim 1, wherein the mixture further comprises sustainable oils from renewable sources.

6. The hose according to claim 1, wherein the reinforcement layer comprises fiber from a sustainable material.

7. The hose according to claim 1, wherein the sustainable content is an amount of up to 95% by weight based upon total hose weight.

8. The hose according to claim 1, wherein the sustainable content is an amount of greater than 25% by weight based upon total hose weight.

9. The hose according to claim 8, wherein the sustainable content is an amount of greater than 50% by weight based upon total hose weight.

10. A hose comprising an inner tube, a reinforcement layer disposed outwardly from the inner tube, and a cover layer disposed outwardly from the reinforcement layer, wherein the inner tube comprises a cured composition having a sustainable content and formed from a mixture comprising EPDM/EPR sustainable polymer, silica, calcium carbonate, and a sulfur based curing system, wherein the EPDM/EPR sustainable polymer comprises ethylene monomer derived from one or more renewable sources, and wherein silica and calcium carbonate are derived from other renewable sources.

11. The hose according to claim 10, wherein the silica is derived from waste rice husks, and wherein the calcium carbonate is derived from waste eggshells.

12. The hose according to claim 10, wherein the EPDM/EPR sustainable polymer comprises ethylene monomer derived from sugar cane.

13. The hose according to claim 10, wherein the mixture further comprises recovered carbon black.

14. The hose according to claim 10, wherein the mixture further comprises sustainable oils from renewable sources.

15. The hose according to claim 10, wherein the reinforcement layer comprises fiber from a sustainable material.

16. The hose according to claim 10, wherein the sustainable content is an amount of up to 95% by weight based upon total hose weight.

17. The hose according to claim 10, wherein the sustainable content is an amount of greater than 25% by weight based upon total hose weight.

18. The hose according to claim 17, wherein the sustainable content is an amount of greater than 50% by weight based upon total hose weight.

19. The hose according to claim 10, wherein the cover layer comprises a cured composition formed from a mixture comprising EPDM/EPR sustainable polymer and a sulfur or peroxide based curing system.

20. A hose comprising an inner tube, a reinforcement layer disposed outwardly from the inner tube, and a cover layer disposed outwardly from the reinforcement layer;
wherein the inner tube comprises a cured composition having a first sustainable content and formed from a first mixture comprising EPDM/EPR sustainable polymer, silica, calcium carbonate, and a sulfur or peroxide based curing system, wherein the EPDM/EPR sustainable polymer comprises ethylene monomer derived from one or more renewable sources, and wherein silica and calcium carbonate are derived from other renewable sources;
wherein the cover layer comprises a cured composition having a second sustainable content and formed from a second mixture comprising EPDM/EPR sustainable polymer and a sulfur based curing system;
wherein the first mixture and the second mixture each further comprise recovered carbon black and sustainable oils from renewable sources;
wherein the reinforcement layer comprises fiber from a sustainable material; and,
wherein the combined total of the first sustainable content and second sustainable content is an amount of greater than 50% by weight based upon total hose weight.

* * * * *

EX PARTE REEXAMINATION CERTIFICATE (12759th)
United States Patent
Miller et al.

(10) Number: US 11,565,494 C1
(45) Certificate Issued: Oct. 25, 2024

(54) SUSTAINABLE INDUSTRIAL HOSE

(71) Applicant: ContiTech USA, Inc., Fairlawn, OH (US)

(72) Inventors: Lance Miller, Uniontown, OH (US); Jeffrey T. Epperson, Mount Pleasant, IA (US); Jenny Zhaoxia Yu, Shanghai (CN); Mathew Augustine, Fairlawn, OH (US); Jeffrey P. Dotson, Riverside, IA (US)

Reexamination Request:
No. 90/019,339, Jan. 9, 2024

Reexamination Certificate for:
Patent No.: 11,565,494
Issued: Jan. 31, 2023
Appl. No.: 17/453,201
Filed: Nov. 2, 2021

Related U.S. Application Data

(63) Continuation-in-part of application No. 16/813,173, filed on Mar. 9, 2020, now Pat. No. 11,168,815.

(51) Int. Cl.
*B32B 1/08* (2006.01)
*B32B 5/02* (2006.01)
*B32B 7/12* (2006.01)
*B32B 25/10* (2006.01)
*B32B 25/16* (2006.01)
*F16L 11/08* (2006.01)

(52) U.S. Cl.
CPC ............ *B32B 1/08* (2013.01); *B32B 5/026* (2013.01); *B32B 7/12* (2013.01); *B32B 25/10* (2013.01); *B32B 25/16* (2013.01); *F16L 11/08* (2013.01); *B32B 2255/02* (2013.01); *B32B 2255/26* (2013.01); *B32B 2270/00* (2013.01); *B32B 2597/00* (2013.01); *F16L 11/081* (2013.01); *F16L 11/085* (2013.01)

(58) Field of Classification Search
None
See application file for complete search history.

(56) References Cited

To view the complete listing of prior art documents cited during the proceeding for Reexamination Control Number 90/019,339, please refer to the USPTO's Patent Electronic System.

*Primary Examiner* — Terrence R Till

(57) ABSTRACT

Hoses include an inner tube, a reinforcement layer disposed outwardly from the inner tube, and a cover layer disposed outwardly from the reinforcement layer, where the cover layer and/or the inner tube includes a cured composition having a sustainable content and formed from a mixture including EPDM/EPR sustainable polymer and a sulfur or peroxide based curing system. In some cases, the EPDM/EPR sustainable polymer has ethylene monomer derived from one or more renewable sources, such as, ethylene monomer derived from sugar cane. The mixture may further include one or more of recovered carbon black and sustainable oils from renewable sources. The hose embodiments may also include the reinforcement layer formed of fibers from sustainable material. The hose may contain the sustainable content in an amount of up to 75% by weight based upon total hose weight, or even greater than 25% by weight based upon total hose weight.

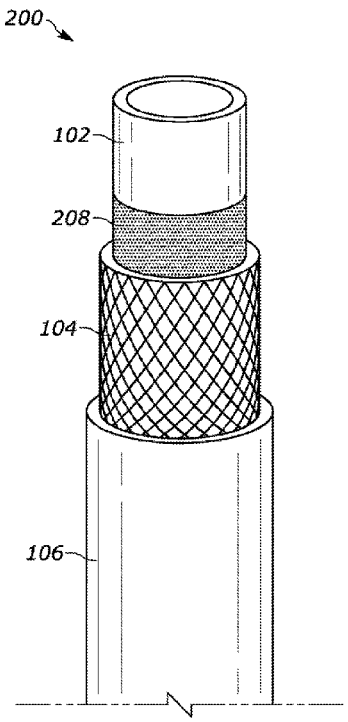

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-20 are cancelled.

* * * * *